(12) United States Patent
Ward

(10) Patent No.: US 6,455,512 B1
(45) Date of Patent: Sep. 24, 2002

(54) WATER-SOLUBLE ESTERIFIED HYDROCOLLOIDS

(75) Inventor: Florian Magno Ward, Chadds Ford, PA (US)

(73) Assignee: TIC Gums, Inc., Belcamp, MD (US)

( * ) Notice: Subject to any disclaimer, the term of this patent is extended or adjusted under 35 U.S.C. 154(b) by 51 days.

(21) Appl. No.: 09/799,425

(22) Filed: Mar. 5, 2001

(51) Int. Cl.⁷ .................. A61K 31/715; C08B 37/18
(52) U.S. Cl. .................. 514/59; 514/53; 514/25; 514/54; 514/57; 514/58; 514/59; 514/61; 536/4.1; 536/18.2; 536/18.6; 536/63; 536/69; 536/103; 536/112; 536/114; 536/123; 536/123.1; 536/123.13
(58) Field of Search .................. 536/4.1, 18.2, 536/18.6, 69, 63, 103, 112, 114, 123, 123.1, 123.12; 514/53, 25, 54, 57, 58, 59

(56) References Cited

U.S. PATENT DOCUMENTS

| | | | |
|---|---|---|---|
| 2,661,349 A | 12/1953 | Caldwell et al. | 260/224 |
| 4,035,235 A | 7/1977 | Richards et al. | 195/31 R |
| 5,321,132 A | 6/1994 | Billmers et al. | 536/48 |
| 5,580,553 A | 12/1996 | Nakajima | 424/78.17 |
| 5,672,699 A | 9/1997 | Billmers et al. | 536/102 |
| 5,977,348 A | 11/1999 | Harris et al. | 536/107 |
| 6,037,466 A | 3/2000 | Maliczyszyn et al. | 536/102 |
| 6,303,584 B1 * | 10/2001 | Richards | 514/54 |

* cited by examiner

Primary Examiner—Peter O'Sullivan
(74) Attorney, Agent, or Firm—Huntley & Associates

(57) ABSTRACT

Emulsifiers based on the reaction product of hydrocolloid and dicarboxylic anhydrides, especially useful in the preparation of oil-in-water emulsions.

17 Claims, No Drawings

WATER-SOLUBLE ESTERIFIED HYDROCOLLOIDS

BACKGROUND OF THE INVENTION

Caldwell et al., in U.S. Pat. No. 2,661,349, disclose water-dispersible reaction products of starch or cellulose with, inter alia, alkyl- and alkenyl-substituted dicarboxylic acid anhydrides. Specifically, starch reacted with octenylsuccinic anhydride (OSAn) is now an established commercial product, and hereinafter is referred to as "OSAn-starch." While starch itself has no emulsifing properties, the octenylsuccinylated starch is characterised by having both hydrophilic and hydrophobic groups and does provide emulsifying properties. Various improvements of Caldwell's process have been described, such as by Richards in U.S. Pat. No. 4,035,235, Billman in U.S. Pat. No. 5,672,699, Maliczyszyn et al. in U.S. Pat. No. 6,037,466. Harris et al, in U.S. Pat. No. 5,977,348, disclose the esterification of various polysaccharides in a densified liquid such as supercritical carbon dioxide. Harris et al. list starches, gums, celluloses, dextrins, glycogen, hemicelluloses, dextrans, inulins, and gums (agar, arabic gum, karaya gum, tragacanth gum, pectin, carrageenan, alginates, tamarind seed gum, xanthan gum, konjac gum, guar gum, gum acacia, (also known as gum arabic) and locust bean (or carob seed) gum as "bases" that may be treated. Harris states that "bases" such as guar gum can not be efficiently modified, as, when solubilized in water or organic solvents, they are too viscous to process in solutions containing above about 1% solids by weight. Nakajima, in U.S. Pat. No. 5,580,553, discloses the reaction of saccharides (mono-, di-, and oligo-saccharides) with at least 30 parts by weight of an alkenylsuccinic anhydride per 100 parts of the saccharide, and up to parts of the anhydride to make surfactants providing desired foaming properties in cosmetic applications. OSAn-starch is used as an emulsifier for oil-in-water emulsions in, for example, bakery, beverages, and salad dressings. Typically its use is limited to "weighted" emulsions. Weighted emulsions are emulsions wherein a weighting agent, such as glyceryl abietate, brominated vegetable oil, or sucrose acetate isobutyrate (SAIB), is added to the oil phase. The weighting agent reduces the difference in density between the oil (less dense) and water (more dense) phases, thus reducing the sedimentation rate. For many beverages, a concentrated flavor oil emulsion is diluted with water, sweeteners, and soluble additives such as citric acid, and then carbonated, to yield a clear beverage. Weighting agents are used when opacity of the final beverage is required or desired. While this is acceptable for naturally opaque beverages such as orange juice, it is unacceptable for beverages intended to be clear. For such clear beverages, OSAn-starch may not provide stable unweighted flavor emulsions, resulting in some phase separation, such as an unacceptable oil ring forming at the liquid surface. Typically, in such cases, an emulsifying grade of gum acacia (from Acacia Senegal and related species) is used as the emulsifying agent. Emulsifying grades of gum acacia are expensive, the supply is seasonal, and the supply is subject to U.S. trade sanctions, bans, and embargoes. Additionally, some corn starch producers have been unable to guarantee their products are not derived from genetically modified organisms (GMO), creating a marketing problem where consumers demand products that are "GMO-free."

Thus it would be desirable to have polysaccharide or hydrocolloid emulsifiers that are not based on cornstarch or its derivatives, are effective with and without weighting agents, and do not have the supply problems and costs of emulsifying grade gum acacia. The present invention provides a range of such products.

SUMMARY OF THE INVENTION

The present invention provides emulsifiers that satisfy the needs noted above.

Specifically, the instant invention provides an emulsifier comprising the reaction product of at least one hydrocolloid having a viscosity of about from 2 to 500 cP in 10% aqueous solution at 20° C. and about from 2 to 15% by weight, based on the hydrocolloid, of at least one dicarboxylic acid anhydride selected from alkane- and alkene-substituted dicarboxylic acid anhydrides. The emulsifiers preferably further comprise up to about 95%, by weight of the total solids, of at least one carbohydrate bulking agent. The invention also provides oil-in-water emulsions based on these emulsifiers.

DETAILED DESCRIPTION OF THE INVENTION

The present invention is directed towards new compositions of matter, comprising the reaction products of alkane- and alkene-substituted dicarboxylic acid anhydrides and at least one low viscosity hydrocolloid (hereinafter Class A). The hydrocolloid can further comprise up to about 95%, by weight of the total solids, of at least one carbohydrate bulking agent (hereinafter Class B). The invention is further directed to oil-in-water emulsions comprising about from 1 to 60 weight % of at least one oil, about from 0.5 to 30 weight % of at least one emulsifier as described above, and water.

Preferred alkane- and alkene-substituted dicarboxylic acid anhydrides which can be used in the present invention include those represented by the following Formula 1:

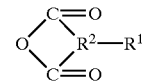

Formula 1 where $R^1$ is a straight or branched chain alkyl radical or branched or straight chain ethylenically-unsaturated alkyl radical having 3–18, and preferably 6–10, carbon atoms, and $R^2$ is a divalent saturated or divalent unsaturated radical having 2–3 and preferably 2 carbon atoms. $R^1$ can contain more than one ethylenically-unsaturated group. Most preferred is octenylsuccinic anhydride due to its ready availability. For simplicity, octenylsuccinic anhydride (hereinafter abbreviated as "OSAn") will be used to represent typical anhydrides of Formula 1. The amount of OSAn used, based on the solids content of the hydrocolloid or hydrocolloid and bulking agent solution, is about 2–15%, and preferably about 10%.

The hydrocolloids, which are also commonly known as water-soluble gums, of Classes A and B are natural or hydrolyzed hydrocolloids that disperse in water giving solution viscosities of about 2–500 cP (0.002–0.5 Pa-s) in 10% aqueous solution at 20° C., preferably about 2–250 cP (0.002–0.25 Pa-s) at 10% concentration, and most preferably about 2–100 cP (0.002–0.1 Pa-s) at 10% concentration. While certain natural hydrocolloids such as non-emulsifying gum acacia (from *Acacia seyal* and related species) and inulin provide such low viscosities, other hydrocolloids such as guar gum require partial hydrolysis to reduce their solution viscosities to such lower values. Reduction of the viscosity of the hydrocolloids is effected by methods well known to those skilled in the art, including enzymatic, acid or base hydrolysis, or gamma irradiation, etc. The extent of such pre-hydrolysis is that sufficient to provide a hydrolyzed hydrocolloid that has the specified range of viscosity in water.

The carbohydrate bulking agents are added to raise the solids content, but not the viscosity, of the aqueous hydrocolloid solution, thereby maintaining the handling and blending characteristics of the final emulsions. The bulking agents can be selected from a wide variety of materials, including, for example, hydrolyzed polysaccharides, oligosaccharides, or monosaccharides. Dextrins (defined as a hydrolyzed starch) and dextrose (glucose) are preferred for their ready availability, lack of color, and a taste that is either bland or absent. The dextrins can be prepared from any starch source, including but not limited to corn, potato, and tapioca. Sources of starch other than from corn may be desirable if contamination of corn by GMO is of concern. Dextrins of various oligosaccharide lengths are described by the dextrose equivalent (DE) value, determined by measuring the percent reducing value of the dextrin compared with glucose. Thus dextrose has a DE value of 100 and starch itself has a DE of 0. Dextrins with a DE value equal to or greater than about 10 are preferred. Dextrins with DE values less than about 5 tend to have limited solubility in water and can contribute undesirable cloudiness to products. The bulking agent is added in an amount sufficient to raise the solids content of the aqueous hydrocolloid solution, prior to reaction with the OSAn, to about 5–70% by weight, preferably about 10–40%, and most preferably about 15–25%. The combination of viscosity and solids content of the substrate prior to treatment with OSAn is generally achieved with a ratio of hydrocolloid to bulking agent of about from 1:0 to 5:95. Higher solids allow more efficient drying of the product when a powdered product is desired. For flavor emulsions, a minimum concentration of about 5% of the OSAn is preferred to stabilize the emulsion. At these concentrations, the emulsifying agent forms a film around the oil particles, preventing coalescence. For other applications, such as salad dressings, lower emulsifying agent concentrations can be effective. However, OSAn treatment of more concentrated solutions of the hydrocolloid or hydrocolloid and bulking agent, hereinafter referred to as the "carbohydrate substrate," is more efficient. The OSAn reaction involves both the hydrocolloids and bulking agent components of the carbohydrate substrate. The product can be diluted in subsequent formnulations. The hydrocolloids listed in Table 1 are representative of those that can be used in the present invention. Other natural and synthetic hydrocolloids can also be used in the practice of this invention.

TABLE 1

Hydrocolloids, Sources, and Hydrolysis Requirements.

| Type or Source | Hydrocolloid | Hydrolysis requirement |
| --- | --- | --- |
| Galactomannans | Guar gum | Yes |
| | Locust bean gum | Yes |
| | Tara gum | Yes |
| Arabinogalactans | Arabinogalactan (Larix sp.) | No |
| | Gum acacia | No |
| | Karaya gum | Optional |
| | Ghatti gum | Optional |
| Seaweed Extracts | Sodium alginate | Optional |
| | Carrageenan | Yes |
| | Agar | Optional |
| Biosynthetic | Xanthan | Yes |
| Microbial Products | Gellan gum | Optional |
| | Dextran | No |
| Plant Extracts | Pectin | Optional |
| | Konjac flour | Optional |
| | Inulin | No |
| Cellulose Derivatives | Carboxymethyl cellulose | Optional |
| | Other modified celluloses | Optional |
| Synthetic Polysaccharides | Polydextrose | No |

The OSAn reaction can be, and typically is, carried out at ambient temperature, although temperatures in the range of about from 0 to 100° C. can be used. Preferred are temperatures of about from 10 to 80° C., and most preferred is about 20–30° C. Higher temperatures are known to damage the protein component of gums such as gum acacia, guar gum, and locust bean gums, and such damage should typically be avoided. OSAn freezes at about 10° C. and is stirred into the aqueous solution to form an emulsion that reacts with the carbohydrate substrate that is dispersed or dissolved in the aqueous phase. Thus temperatures of about from 0 to at least 10° C. can require pre-emulsification of the OSAn above 10° C. The carbohydrate substrate can be dispersed or dissolved in water to give an aqueous phase containing the desired solids level. With vigorous agitation, the OSAn is added and agitation is maintained until the OSAn has substantially completely reacted. This is typically about 4–10 hours at 20° C. When the OSAn has reacted, the reaction mass becomes homogeneous and no phase separation occurs when the agitation is stopped. The time to react is dependent on the reaction temperature. The product can be isolated by any convenient procedure, including but not limited to alcohol precipitation or any method of dehydration such as evaporation, spray drying, or drum drying. The aqueous reaction product can be either concentrated, used as is, or diluted, depending on the requirements of the final application.

The OSAn-treated hydrocolloids, and particularly OSAn-treated mixtures of hydrocolloid and bulking agent (both hereinafter termed "OSAn-hydrocolloid"), of the present invention provide valuable advantages. Application of OSAn-hydrocolloids in foods is subject to existing and future food regulations. OSAn-hydrocolloids are useful emulsifying agents that can be used for unweighted emulsions that require clarity as well as weighted emulsions.

Mammalian digestive enzymes do not degrade the hydrocolloid backbone. Accordingly, OSAn-hydrocolloids represent a desirable source of soluble dietary fiber. The OSAn-hydrocolloids share with the parent hydrocolloid the ability to simulate the texture of a high fat formulation and thus act as a partial fat replacer for a reduced fat formulation. While the parent hydrocolloids are mainly hydrophilic in character, the OSAn-treatment adds hydrophobicity or lipophilicity to the molecule, and provides an improved hydrophile-lipophile balance. The OSAn-treatment allows the utilization of so-called "non-emulsifying gum acacia" to be used as a replacement for "emulsifying gum acacia." As indicated above, the non-emulsifying varieties are cheaper, come from wider and less seasonal sources, and are available from a wide range of sources, eliminating the problems associated with U.S. trade sanctions, bans, and embargoes. OSAn-gum acacia prepared from non-emulsifying gum acacia is significantly more effective as an emulsifying agent than emulsifying gum acacia itself. For example, a stable emulsion can be formed using 5% OSAn-treated non-emulsifying acacia, 10% oil, and 85% water. A stable emulsion using emulsifying gum acacia typically requires at least 15% gum acacia, 10% oil, and water (cf. Example 1 and Comparative Examples B1 and B2).

Certain hydrocolloids, such as gum acacia and guar gum, are known to have higher levels of branching in the polysaccharide backbone, a property that protects flavors in emulsions from oxidation, as might otherwise occur when flavor emulsions are spray dried. An example is the suppression of the formation of limonene epoxide from limonene during spray drying (See Reineccius, Ward, Whorton, & Andon, Developments in Gum Acacia for Encapsulation of Flavors, Am. Chem. Soc. Symp. Ser. 590: 161–168 (1995)).

Certain hydrocolloids, such as gum acacia, xanthan, alginates, and sodium carboxymethylcellulose (CMC), contain anionic groups in the polysaccharide backbone. Anionic groups repel each other, preventing oil droplet coalescence and supplementing the effect from the anionic groups introduced during OSAn treatment, thus further enhancing the emulsifying properties of the OSAn-treated hydrocolloids of this invention.

The OSAn-hydrocolloids of the present invention can be used as emulsifying agents by methods well known to those skilled in the art. As an example, the OSAn-hydrocolloid can be dispersed in water at the desired concentration, e.g., 5%, the oil added with vigorous agitation (e.g., in a Ross mixer, see Examples) to form a coarse oil-in-water emulsion. The particle size of the coarse emulsion is then reduced using conventional techniques by passing the mixture through a homogenizer or colloid mill. Additional particulate ingredients, as in salad dressing emulsions, can be added after homogenization using conventional techniques.

Conventional Coulter Counter analysis of the diluted emulsion provides a plot of the differential counts vs. particle size distribution. This analysis can be carried out, for example, according to the procedures described in Ward, Cell and Developmental Biology of Arabinogalactan-Proteins, Nothnagel et al., Ed. 2000, Kluwer Academic/Plenum Publishers. From that analysis, two criteria may be selected that are used as objective indices of emulsion stability. These criteria are (i) percent of emulsion particles with diameter less than 2 $\mu$m and (ii) median particle size of the emulsion. Larger percentages of particles less than 2 $\mu$m and smaller median sizes both correlate well with emulsion stability. For the OSAn-treated hydrocolloid emulsifying agents of this invention, a percentage particle size less than 2 $\mu$m of at least 60% is preferred with a median particle size of 2 $\mu$m or less. Other emulsion stability tests such as the beverage industry's "ring test" and oven accelerated shelf-life studies at 40° C. give results consistent with those of the Coulter Counter.

Oil-in-water emulsions prepared with the OSAn-hydrocolloid compositions of the present invention preferably comprise about from 1 to 60 weight % oil, about 0.5–30% OSAn-hydrocolloid, and water. Typically many industrial uses of emulsions involve subsequent dilution in use.

The amount of OSAn used is lower than that required fully to esterify all of the hydroxyl groups in the carbohydrate substrate mixture. Thus, many of the properties of the original hydrocolloid are largely unchanged, but in association with enhanced emulsifying properties. The OSAn-treated hydrocolloids therefore can also be used as suspending agents, water binding agents, and water-soluble fat replacers.

The OSAn-hydrocolloids of the present invention provide valuable properties. The practice of the present invention is further illustrated by the following examples, which are intended to demonstrate and not to limit the invention. Trademarks are shown in upper case.

EXAMPLES

Example 1

OSAn Treatment of Non-emulsifying Gum Acacia and Evaluation as an Emulsifying Agent (a) OSAn Treatment.

To a 500-mL beaker containing water (300 mL) and anhydrous sodium carbonate (2 g, solution pH about 8) and equipped with a magnetic means for vigorous agitation was added 40 g of ARABIC FT (a non-emulsifying gum acacia available from TIC Gums, Inc., Belcamp Md.). The beaker was covered and the mixture stirred vigorously. Water was added to bring this reaction solution weight to 400 g. At ambient temperature (20–25° C.), OSAn (4 mL, from Milliken & Company (Spartansburg N.C.) corresponding to 10% by weight of the dissolved hydrocolloid was added by pipette into the vortex. The specific gravity of the OSAn was 1.00. Agitation at room temperature was continued overnight (12–16 hr). The pH was adjusted to 7.0 by the addition of a small amount of 6N hydrochloric acid. The product can be isolated at this stage if desired.

(b) Evaluation as an Emulsifying Agent.

Octenylsuccinylated gum solution (20 g), prepared as above, was placed in a beaker, diluted with 340 mL water and mixed for 30 minutes. 40 g Brazilian orange oil (Hagelin & Co., Branchburg N.J.) was gradually added to the vortex of the stirred gum solution and mixed for 10 min in a Ross mixer (Charles Ross & Son Co., Hauppauge N.Y.) to create a coarse emulsion. The coarse emulsion was homogenized twice in a homogenizer (Arrufield, Ltd., Ringwood, Hampshire, England) to give a final concentrated flavor emulsion. The emulsion contained 5% emulsifying agent and 10% oil. After one, and seven days' storage, an aliquot of the emulsion (1 mL) was diluted to about 1 L (1:1,000) in a volumetric flask. Samples of the diluted emulsion were analyzed for particle size distribution using a Coulter Counter (Elzone Model, Particle Data Inc., Elmhurst Ill.). From the Coulter Counter results, two criteria are shown in Table 2, percent of particles with diameter less that 2 $\mu$m and median particle size. The results after seven days at room temperature are shown in Table 2A.

Example 2

Octenylsuccinylation of Mixed Hydrolyzed Guar Gum and Non-emulsifing Gum Acacia (a) Preparation of Hydrolyzed Guar Gum.

Guar gum (1,500 g of GUAR 8/22, a galactomannan obtained from the seed of *Cyamopsis tetragonolobus*, having a viscosity of 3,000 cP (3 Pa-s) at 1% aqueous solution, corresponding to a MW>350,000, and available from TIC Gums, Inc., Belcamp Md.) was added gradually to 3,920 g water. The pH was adjusted to 5.5, and the temperature adjusted to 60° C. 15 mL of GAMANASE solution, corresponding to about 15,750,000 Viscostiy Hemicellulase Units (VHCU) was added with stirring and the hydrocolloid allowed to hydrolyze at 60° C. until the viscosity decreased to ~85 cP (0.085 Pa-s, 10% aqueous solution., corresponding to a MW<~30,000). GAMANASE is a galactomannanase available from Novo Nordisk Biochem, North America, Inc., Franklinton N.C. The solution was heated to 80° C. for 1–3 h to inactivate the enzyme and evaporate the solution to 36° Brix. The hydrolysis product was dried in a convection oven at 105° C. Other means of hydrolysis such as with alkali, acid, or by gamma irradiation can be substituted. The hydrolysis product can also be used without drying as a solution.

(b) Octenylsuccinylation of Mixed Hydrolyzed Guar Gum and Non-emulsifying Gum Acacia.

Using the procedure of Example 1, to a solution of 300 g water and 2 g anhydrous sodium carbonate was added 40 g dry hydrolyzed guar gum (prepared as above) and 40 g ARABIC FT. The reaction solution was diluted to a weight of 400 g, and mixed for 30 min. Octenylsuccinic anhydride (8 mL) was added at room temperature (20–25° C). After stirring overnight (12–16 hr) at room temperature, the pH was adjusted to 7.0 by the addition of a small amount of 6N hydrochloric acid. Isolation of the product at this stage is optional. The emulsifying properties were measured as in Example 1(b); results are shown in Table 2A.

Examples 3–10

Octenylsuccinylation of Other Carbohydrate Substrate Mixtures

Additional compositions were prepared according to the procedure described in Example 1 (single hydrocolloid carbohydrate substrate) or Example 2 (more than one carbohydrate substrate component). The emulsifying properties were measured as in Example 1 (b) and the results are shown in Table 2A.

Examples 7a and 7b

Preparation of Other Hydrolyzed Gums

| Ref. | Parent Hydrocolloid | Initial Viscosity, 10% soln. | Hydrolysis Method | Hydrolysis Conditions | Product Viscosity, 10% soln. |
|---|---|---|---|---|---|
| 7a | Guar gum | >>1000 cP (>>1 Pa-s) | Gamma irradiation | See note* | ~80 cP (0.08 Pa-s) at 1% |
| 7b | λ-Carrageenan | 2710 cP (2.71 Pa-s) | Acid | pH 3.8, 30 min., 170° C. | 9 cP (0.009 Pa-s) |

*Example 7a was prepared by exposing GUAR 8/22 to a $^{60}$Co gamma radiation dose sufficient to reduce the viscosity to the value shown.

Comparative Examples A–G

Control Emulsification Tests of Hydrocolloids without Octenylsuccinylation

Emulsification tests were completed according to the process of Example 1(b) and results are shown in Table 2B.

Comparative Examples H–N

Octenylsuccinylation of Hydrocolloids at Low Esterification Levels and of Hydrocolloids with Higher Viscosities Octenylsuccinylation of various hydrocolloids and emulsification tests were completed according to the general procedure of Example 1 and results are shown in Table 2B.

TABLE 2A

Examples of the OSAn Treatments of Additional Carbohydrate Substrates, and Performance as Emulsifying Agents. (Footnotes to Tables 2A and 2B follow Table 2B)

| Ex. #[a] (Class) | Hydrocolloid(s)[b] g | Bulking Agent g | OSAn %[c] | % <2 μm[d] | Median μm | U/W[f] |
|---|---|---|---|---|---|---|
| 1(A) | ARABIC FT 40 | None | 10 | 91.3 | 1.173 | U |
| 2a(A) | ARABIC FT 40, GUAR HLV 40 | None | 10 | 91.7 | 1.335 | U |
| 3(A) | Arabinogalactan 80 | None | 10 | 79.9 | 1.550 | U |
|  |  |  |  | 80.5 | 1.472 | W |
| 4(A) | ARABIC FT 40, GUAR IR 40 | None | 9.5 | 94.5 | 1.408 | U |
| 5(A) | GUAR HLV 40 | None | 10 | 89.1 | 0.978 | U |
|  |  |  |  | 88.8 | 0.904 | W |
| 6(B) | GUAR HLV 40 | Dextrin 40 | 10 | 93.2 | 1.283 | U |
| 7(B) | GUAR IR 8 | Dextrin 72 | 10 | 94.0 | 1.252 | U |
| 8(A) | Inulin 80 | None | 10 | 97.8 | 1.155 | U |
| 9(A) | Polydextrose | None | 10 | 97.6 | 1.35 | U |
| 10(B) | "CMC 15" 16 | Dextrin 64 | 10 | 66.3 | 1.635 | U |
|  |  |  |  | 7.41 Broken[e] | 4.588 | W |

TABLE 2B

Comparative Examples.

| Comp. Ex. # | Hydrocolloid(s)[b] g | Bulking Agent g | OSAn %[c] | Emulsion particle size (after 7 days) % <2 μm[d] | Median μm | U/W[f] |
|---|---|---|---|---|---|---|
| *Comparative Examples With No Esterification* | | | | | | |
| A | ARABIC FT | None | 0 | 38.1 Broken[e] | 2.141 | U |
| B1 | 5% ARABIC SPRAY DRY[g] | None | 0 | 32.6 | 2.25 | U |
| B2 | 15% ARABIC SPRAY DRY[h] | None | 0 | 63.7 | 1.73 | U |
| C | Inulin | None | 0 | 9.18 | 6.132 | U |
| D | GUAR HLV | None | 0 | 19.9 Broken[e] | 4.08 | U |
| E | GUAR IR | None | 0 | 11.5 | 5.21 | W |
| F | "CMC 15"[i] 16 | Dextrin 64 | 0 | 6.21 | 9.167 | U |
| G | None | Dextrin | 0 | 4.95 Broken[e] | 8.93 | U / W |
| *Esterified Comparative Examples* | | | | | | |
| H | ARABIC FT 100 | None | 0.25 | 37.6 | 2.262 | U |
| I | Guar HLV 100 | None | 0.25 | 7.41 | 5.840 | U |
| J | GUAR IR 20 | None | 10 | Broken | | W |
| K | "GUAR 8/22" 8 | None | 5 | 4.84 / 19.8 | 7.80 / 2.878 | U / W |
| L | Xanthan[j] 4 | Dextrose 76 | 5 | 3.82 / 5.37 | 7.60 / 4.087 | U / W |
| M | Xanthan 2, GUAR Bland[k] 2 | Dextrose 72 | 5.26 | 3.82 / 5.37 | 7.60 / 4.087 | U / W |
| N | None[l] | Dextrin 80 | 10 | Broken | | U |

[a]The letter following an Example # denotes the Hydrocolloid Class (see text).
[b]ARABIC FT (Examples 1, 2a, 4, A and H) is a non-emulsifying gum acacia, viscosity at 10% = 8 cP (0.008 Pa-s).
GUAR HLV (Examples 2a, 5, 6, D, and I) is a guar gum hydrolyzed as in Example 2, viscosity at 10% = 80 cP (0.08 Pa-s).
GUAR IR (Examples 4, 7, E and J) is a guar gum partially hydrolyzed by $^{60}Co$ γ-radiation, viscosity at 1% = 80–90 cP (0.08–0.09 Pa-s).
GUAR Bland (Example M) is an unhydrolyzed, deodorized, high viscosity guar gum, viscosity at 1% = 3000–3800 cP (3–3.8 Pa-s).
CMC 15 (Example 10 and F) is a low viscosity sodium carboxymethylcellulose gum, viscosity at 2% = 80–100 cP (0.08–0.1 Pa-s).
GUAR 8/22 (Example K) is a guar gum as extracted (unhydrolyzed) from guar seeds, viscosity at 1% = 4400–5000 cP (4.4–5 Pa-s).
Arabinogalactan (Example 3) is a hydrocolloid from *Larix* sp., viscosity at 25% = 6–10 cP (0.006–0.01 Pa-s).
Inulin (Examples 8 and C) is a fructooligosaccharide from chicory root, viscosity at 10% = 4.0 cP (0.004 Pa-s).
Xanthan (Examples L and M) is a biosynthetic product of *Xanthomonas campestris*, viscosity at 1% 1000–2000 cP (1–2 Pa-s).
Polydextrose (Example 9) is a randomly-bonded condensation polymer of dextrose with bound sorbitol and citric acid, viscosity at 5% = 35 cP (0.035 Pa-s) and is available from Cultor Food Science, Schaumburg, Illinois
All gums listed in footnote (a) except Polydextrose were obtained from TIC Gums, Belcamp MD.
[c]Based on the combined amount of hydrocolloid and bulking agent in water prior to the addition of OSAn. Sodium carbonate is added at the rate of 0.5% of the total solution or suspension prior to the addition of OSAn (equivalent to 2 g in 400 g solution or suspension of hydrocolloid and bulking agent).
[d]Coulter Counter measurements were sometimes omitted when the emulsion was "broken".
[e]"Broken" indicated visible phase separation in the emulsion had ocurred. Measurement of particle size may have been omitted.
[f]Emulsion type, U unweighted, W weighted (see text).
[g]ARABIC SPRAY DRY (Examples B1 and B2) is an emulsifying grade gum acacia (*Acacia senegal*, see text), viscosity at 10% = 13 cP (0.013 Pa-s), and was used at the 5% concentration as described in Example 1(b).
[h]ARABIC SPRAY DRY as in note (g) except that is was used at a 15% concentration, i.e., 60 g versus the 20 g in Example 1(b).
[i]CMC/dextrin (Examples 10 and F) viscosity at 10% = 0 cP (0.09 Pa-s).
[j]Xanthan/dextrose (Example L) viscosity at 10% = 320 cP (o.32 Pa-s).
[k]Xanthan/guar/dextrose (Example M) viscosity at 10% = 516 cP (0.516 Pa-s).
[l]Dextrin (Examples G and N) viscosity at 10% = 5 cP (0.005 Pa-s).

Table 2 shows that the Examples 1–10 of the present invention act as emulsifying agents, while Comparative Examples A and C–G without OSAn treatment do not under the conditions tested. Comparative Examples H and I, which have low levels of OSAn treatment, do not produce stable emulsions as shown by large particle size distributions and layer separation. Comparative Examples J–N show high viscosity hydrocolloids with and without bulking agents, when treated with OSAn, do not produce the desired emulsifying properties for beverage emulsions. The OSAn-treated non-emulsifying gum acacia of Example 1 is an effective emulsifying agent at 5% gum level. By comparison, the emulsifying gum acacia of Comparative Example B shows significantly lower emulsifying capacity at the 5% concentration (see text).

I claim:

1. An emulsifier comprising the reaction product of at least one hydrocolloid having a viscosity of about from 2 to 500 cP in 10% aqueous solution at 20° C. and about from 2 to 15% by weight, based on the hydrocolloid, of at least one dicarboxylic acid anhydride selected from alkane- and alkene-substituted dicarboxylic acid anhydrides.

2. An emulsifier of claim 1 wherein the acid anhydride is at least one compound of the general formula

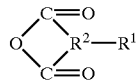

where $R^1$ is an alkyl radical or ethylenically-unsaturated alkyl radical having 3–18 carbon atoms, and $R^2$ is a divalent radical having 2–3 carbon atoms.

3. An emulsifier of claim 2 wherein $R^1$ has 6–10 carbon atoms.

4. An emulsifier of claim 2 wherein $R^2$ has 2 carbon atoms.

5. An emulsifier of claim 2 wherein the acid anhydride consists essentially of octenylsuccinic anhydride.

6. An emulsifier of claim 1 wherein the at least one hydrocolloid comprises at least about 10%, by weight of the hydrocolloid, of each of gum acacia and guar gum.

7. An emulsifier of claim 1 wherein the at least one hydrocolloid has a viscosity of about 2–250 cP in 10% aqueous solution at 20° C.

8. An emulsifier of claim 1 wherein the at least one hydrocolloid has a viscosity of about 2–100 cP in 10% aqueous solution at 20° C.

9. An emulsifier of claim 1 wherein the hydrocolloid further comprises up to about 95%, by weight of the total solids, of at least one carbohydrate bulking agent.

10. An emulsifier of claim 9 wherein the bulking agent is at least one selected from the group consisting of hydrolyzed polysaccharides, oligosaccharides, and monosaccharides.

11. An emulsifier of claim 10 wherein the bulking agent consists essentially of at least one dextrin.

12. An emulsifier of claim 10 wherein the bulking agent consists essentially of dextrose.

13. An emulsifier of claim 10 wherein the bulking agent is present in a quantity of up to 95% by weight of the emulsifying agent solids.

14. A process for the preparation of an emulsifier comprising bringing into contact, under reaction conditions, (a) at least one hydrocolloid having a viscosity of about 2–500 cP in 10% aqueous solution at 20° C. and (b) about from 2 to 15% by weight, based on the hydrocolloid, of at least one dicarboxylic acid anhydride selected from alkane- and alkene-substituted dicarboxylic acid anhydrides.

15. A process for the preparation of an oil-in-water emulsion comprising admixing water and at least one emulsifier of claim 1, and thereafter admixing with oil.

16. An oil-in-water emulsion comprising about from 1 to 60 weight % of at least one oil, about from 0.5 to 30 weight % of at least one emulsifier of claim 1, and water.

17. An oil-in-water emulsion of claim 16 wherein at least about 60% of the oil particles in the emulsion are less than about 2 µm in diameter.

* * * * *